(12) United States Patent
Zavoli et al.

(10) Patent No.: US 6,598,016 B1
(45) Date of Patent: Jul. 22, 2003

(54) SYSTEM FOR USING SPEECH RECOGNITION WITH MAP DATA (75) Inventors: Walter B. Zavoli, Palo Alto, CA (US); Hongche Liu, Fremont, CA (US)

(73) Assignee: Tele Atlas North America, Inc., Menlo Park, CA (US)

( * ) Notice: Subject to any disclaimer, the term of this patent is extended or adjusted under 35 U.S.C. 154(b) by 0 days.

(21) Appl. No.: 09/175,657

(22) Filed: Oct. 20, 1998

(51) Int. Cl.[7] ............................................... G10L 15/04
(52) U.S. Cl. ...................................... 704/251; 704/277
(58) Field of Search ................................ 704/270, 275, 704/277, 211, 215; 340/988, 995

(56) References Cited

U.S. PATENT DOCUMENTS

| | | | | |
|---|---|---|---|---|
| 4,954,958 A | * | 9/1990 | Savage et al. ............... | 364/444 |
| 5,003,601 A | | 3/1991 | Watari et al. ................ | 381/43 |
| 5,177,685 A | * | 1/1993 | Davis et al. ................. | 364/443 |
| 5,355,432 A | | 10/1994 | Tanaka et al. ............... | 395/2.43 |
| 5,471,393 A | * | 11/1995 | Bolger ......................... | 364/450 |
| 5,543,789 A | * | 8/1996 | Behr et al. ................... | 340/995 |
| 5,758,319 A | | 5/1998 | Knittle ......................... | 704/251 |
| 5,761,640 A | * | 6/1998 | Kalyanswamy et al. .... | 704/260 |
| 5,799,279 A | | 8/1998 | Gould et al. ................. | 704/275 |
| 5,987,414 A | * | 11/1999 | Sabourin et al. ............ | 704/270 |
| 5,991,690 A | * | 11/1999 | Murphy ........................ | 701/211 |
| 6,061,003 A | * | 5/2000 | Harada ........................ | 340/995 |
| 6,108,631 A | * | 8/2000 | Ruhl ............................ | 704/270 |
| 6,112,174 A | * | 8/2000 | Wakisaka et al. ........... | 704/251 |

OTHER PUBLICATIONS

Manual for Sony Voice Drive voice recognition unit (in Japanese). See remarks.

* cited by examiner

Primary Examiner—Doris H. To
Assistant Examiner—Michael N. Opsasnick
(74) Attorney, Agent, or Firm—Fliesler Dubb Meyer & Lovejoy LLP (57) ABSTRACT A system is disclosed for using speech recognition with map data. For example, a user could state a location. The system will recognize the words spoken and find the location on a map using an electronic map database. The map can be displayed such that the location is depicted. Alternatively, the user could state two locations. The system will recognize the words spoken, find both locations on the map using an electronic map database, determine a path between the locations and report that path to the user.

1 Claim, 7 Drawing Sheets

SYSTEM FOR USING SPEECH RECOGNITION WITH MAP DATA

BACKGROUND OF THE INVENTION

1. Field of the Invention

The present invention is directed to a system for using speech recognition with map data.

2. Description of the Related Art

The computer has revolutionized the idea of a map from an image statically depicting the location of physical, political, or other features to the electronic map, which consists of geographically referenced electronic data quantifying a physical, social or economic system. The range of information included in electronic maps is unlimited. For example, an electronic map of roads could include distances between elements, travel time, lot numbers, tax information, tourist information, processing time, waiting time, etc. Additionally, storing a map as one or more intelligent data files on a computer allows for unlimited software applications to manipulate that data.

One advantage of the electronic map is that it can store and determine costs associated with various portions of a map. A cost is a variable that can be minimized or maximized. Examples of costs include time, distance, tolls paid, ease of turning, quality of scenery, etc. Typically costs are represented as integers. Sometimes costs can be represented as real numbers or non-standard numbers. Additional information about costs and non-standard numbers can be found in U.S. patent application Ser. No. 08/756,263, "Using Multiple Levels Of Costs For A Pathfinding Computation," filed Nov. 25, 1996, incorporated herein by reference.

Electronic maps can be used for pathfinding, which is a method for computing a route between an origin and a destination. Some systems compute recommended routes and guide the driver by highlighting the recommended route on a map display, or by giving turn-by-turn directions (via paper or display), or both. When a pathfinding system is computing a recommended route to a destination, it does so by finding the most desirable route according to certain specified criteria. These criteria may be specified by the driver, or may be set as defaults at the time of manufacture. Often, a system will be used to find a path that minimizes (or maximizes) some cost, for example, driving time.

An electronic map that is used for pathfinding must carry information about the connectivity of a road network, that is, information about the ways in which pieces of road do or do not connect to each other, for example, where there are ordinary intersections, where there are overpasses, where turns are restricted, and so on. For an area of any significant extent, this is a very large amount of information. An electronic map can include tens or hundreds of megabytes of data. In order to hold such vast quantities of data economically and allow a user to replace maps with updated copies easily, many current pathfinding apparatus (which includes general purpose computers with pathfinding software, automotive navigation systems or other map application equipment) use CD-ROMs to store the electronic map data.

While using electronic maps for pathfinding may be very useful, the complexity of the maps and map tools often require considerable human-machine interaction to achieve a desired result. For example, finding a location on a map or computing a path between two locations may require entering one or more addresses into a computer. This can be time consuming, a distraction or even impossible without the proper equipment. For example, if a system utilizing an electronic map does not include a keyboard, it may be difficult to enter an address. Additionally, if a navigation system is located in an automobile, the driver of the automobile may not be able to enter information into the navigation system while driving. Additionally, traditional systems using electronic maps require the system to be at the same location as the user.

One means for improving systems using electronic maps includes using speech recognition. However, prior art systems which use speech recognition to enable simple human-machine interfaces with map applications have not been very useful. Examples include systems that allow speech recognition for map manipulation commands such as "pan up" or "zoom in." Other systems allow the identification of general areas, such as stating a city or neighborhood and causing the system to draw a map of that city or neighborhood. Higher resolution geographic functions, such as address location, have been tried only using letter by letter spelling to input a street name. Thus, the prior systems have been limited in their utility to either a small set of commands, a low resolution selection method or a slow and cumbersome interface (e.g., spelling out P-e-n-n-s-y-l-v-a-n-i-a A-v-e-n-u-e is tedious). These systems are also inadequate because of the limit of the dictionary of recognizable words and word combinations processed by the speech recognition.

To make a system easy to use, it would be advantageous to be able to recognize locations in a map by allowing a user to state the address or an intersection; however, there are no systems that provide this function.

SUMMARY OF THE INVENTION

The present invention, roughly described, provides for a system for using speech recognition with map data. The system receives a plurality of speech inputs. The speech inputs include one or more pronounced street names, one or more pronounced numbers and/or one or more pronounced commands. Each speech input is associated with one of a set of two or more speech recognition systems. For each speech input, the system accesses the associated speech recognition system in order to recognize the speech input. The system combines a first recognized street name with either a first recognized number or a second recognized street name to form a description of a first location. The system finds that first location in an electronic map and reports that first location.

In one embodiment, the system combines a third recognized street name with either a second recognized number or a fourth recognized street name to form a description of a second location. The system determines a path from the first location to the second location, and reports that path. Reporting the location includes drawing a map depicting the location, stating the location using a speaker, depicting information about the location using a display, passing information about the location to a hardware device or passing information about the location to a software routine. In one embodiment, the step of reporting the path and the step of reporting the first location are performed together by displaying a map which shows the first location as well as the path from the first location to the second location. Two steps of reporting could also be performed separately. The step of reporting the path can also include providing turn-by-turn directions using a map, text or audio. In addition to displaying a location and finding a path, the system can also be used to perform other functions using the electronic map.

The present invention can be implemented using software, hardware, or a combination of software and hardware. When all or portions of the present invention are implemented in software, that software can reside on a processor readable storage medium. Examples of appropriate processor readable storage medium include one or more floppy disks, hard disks, CD ROMs, memory IC's, etc. When the system includes hardware, the hardware may include an output device (e.g. a monitor), an input device (e.g. a keyboard, pointing device and/or a microphone) a processor in communication with the output device and processor readable storage medium in communication with the processor. The processor readable storage medium stores code capable of programming the processor to perform the steps to implement the present invention. The process of the present invention can also be implemented in a web page on the Internet or on a server that can be accessed over the telephone lines.

These and other objects and advantages of the invention will appear more clearly from the following detailed description in which the preferred embodiment of the invention has been set forth in conjunction with the drawings.

DETAILED DESCRIPTION

The system for using speech recognition with map data may be implemented in hardware and/or software. In one implementation, the system may comprise a dedicated processor including processor instructions for performing the functions described herein. Circuits may also be developed to perform the functions described herein. In one embodiment, the system for using speech recognition with map data is part of a navigation system. Examples of navigation systems are described in U.S. Pat. No. 4,796,191, Vehicle Navigation System and Method; U.S. Pat. No. 4,914,605, Map Display Apparatus and Method; U.S. Pat. No. 5,311,195, Combined Relative and Absolute Positioning Method and Apparatus; and U.S. patent application Ser. No. 08/747,161, Navigation System Using GPS Data, all of which are incorporated herein by reference. In another implementation, the system for using speech recognition with map data includes a plurality of processor executable instructions for use with a computer system. Prior to loading into a computer system, the software may reside on a computer readable medium such as a magnetic floppy disk, magnetic tape, and compact disc read only memory (CD-ROM).

Figure 1:
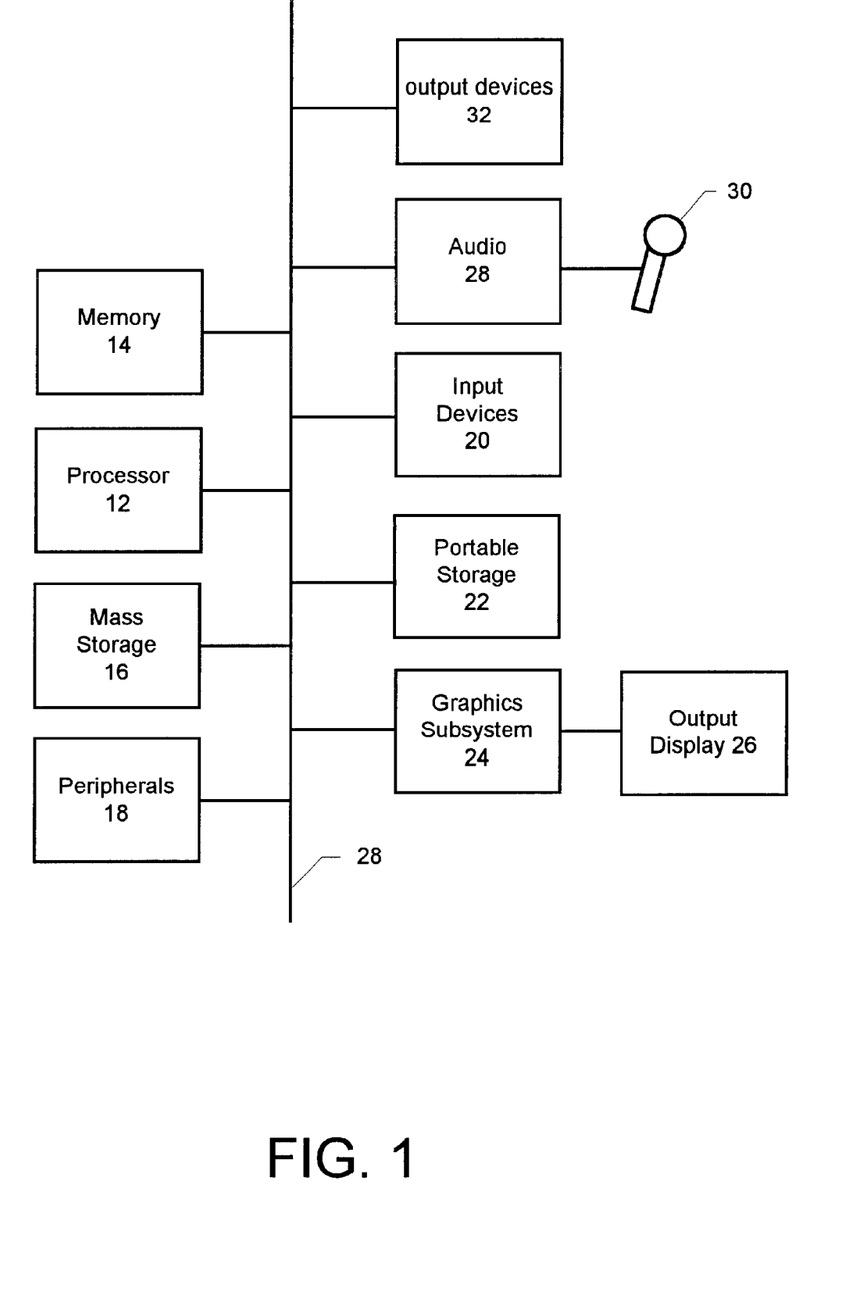
FIG. 1 is a block diagram of one exemplar hardware architecture that can be used to practice the present invention.

FIG. 1 illustrates a high level block diagram of a computer system which can be used to implement the present invention. The computer system of FIG. 1 includes a processor unit 12 and main memory 14. Processor unit 12 may contain a single microprocessor, or may contain a plurality of microprocessors for configuring the computer system as a multi-processor system. Main memory 14 stores, in part, instructions and data for execution by processor unit 12. If the system of the present invention is wholly or partially implemented in software, main memory 14 stores the executable code when in operation. Main memory 14 may include banks of dynamic random access memory (DRAM) as well as high speed cache memory.

The system of FIG. 1 further includes a mass storage device 16, peripheral device(s) 18, input device(s) 20, portable storage medium drive(s) 22, a graphics subsystem 24 and an output display 26. For purposes of simplicity, the components shown in FIG. 1 are depicted as being connected via a single bus 28. However, the components may be connected through one or more data transport means. For example, processor unit 12 and main memory 14 may be connected via a local microprocessor bus, and the mass storage device 16, peripheral device(s) 18, portable storage medium drive(s) 22, and graphics subsystem 24 may be connected via one or more input/output (I/O) buses. Mass storage device 16, which may be implemented with a magnetic disk drive or an optical disk drive, is a non-volatile storage device for storing data and instructions for use by processor unit 12. In one embodiment, mass storage device 16 stores the system software for implementing the present invention for purposes of loading to main memory 14.

Portable storage medium drive 22 operates in conjunction with a portable non-volatile storage medium, such as a floppy disk, to input and output data and code to and from the computer system of FIG. 1. In one embodiment, the system software for implementing the present invention is stored on such a portable medium, and is input to the computer system 10 via the portable storage medium drive 22. Peripheral device(s) 18 may include any type of computer support device, such as an input/output (I/O) interface, to add additional functionality to the computer system 10. For example, peripheral device(s) 18 may include a network interface card for interfacing computer system 10 to a network, a modem, etc.

Input device(s) 20 provide a portion of a user interface. Input device(s) 20 may include an alpha-numeric keypad for inputting alpha-numeric and other key information, or a pointing device, such as a mouse, a trackball, stylus, or cursor direction keys. In order to display textual and graphical information, the computer system of FIG. 1 includes graphics subsystem 24 and output display 26. Output display 26 may include a cathode ray tube (CRT) display, liquid crystal display (LCD) or other suitable display device. Graphics subsystem 24 receives textual and graphical information, and processes the information for output to display 26. Output display 26 can be used to report the results of a pathfinding determination, display a map, display confirming information and/or display other information that is part of a user interface. The system of FIG. 1 also includes an audio system 28, which is connected to microphone 30. In one embodiment, audio system 28 includes a sound card that receives audio signals from microphone 30. Additionally, the system of FIG. 1 includes output devices 32. Examples of suitable output devices include speakers, printers, etc.

The components contained in the computer system of FIG. 1 are those typically found in general purpose computer systems, and are intended to represent a broad category of such computer components that are well known in the art. The system of FIG. 1 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and so on.

Figure 2:
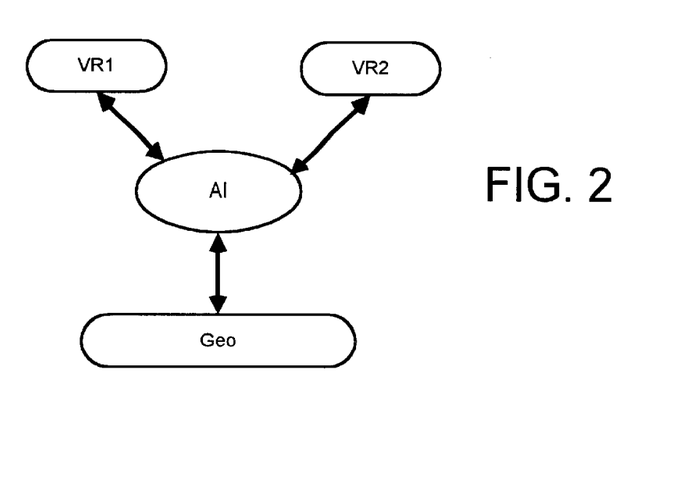
FIG. 2 depicts the modules used to implement one embodiment of the present invention.

FIG. 2 depicts the modules used to implement the invention. In one embodiment, each of the modules depicted in FIG. 2 are implemented using software which would reside on a processor readable storage medium and be executed by a processor. In another embodiment, each of the modules could be separate hardware. The module AI is the audio input and digital signal processing module. Module AI sets up the sound card, collects and digitizes voice signals, transforms the signals to a set of frequency coefficients and sequences the transformed signals to the designated voice recognition modules discussed below. Module AI is in communication with modules VR1, VR2 and Geo. Modules VR1 and VR2 are voice recognition systems. Module VR1 is a voice recognition system for recognizing numbers and simple commands. Thus, module VR1 includes a phonetic dictionary for the relevant numbers and simple commands. Module VR1 will receive information from module AI, search its phonetic dictionary and return the detected single digit number or simple command to module AI. Module VR2 is a voice recognition system with a phonetic dictionary of street names. Module VR2 receives a signal from module AI, searches the phonetic dictionary of street names and returns the detected street name. Module Geo is a map display and user interface. Module Geo communicates with module AI, directs the use of the map data (e.g. pathfinding, goecoding, etc.) and provides for the reporting of information to the operator. Module Geo sends one of two commands to module AI. The first command is to request a phrase from VR1. The second command is to request a phrase from VR2. Module Geo will receive replies that indicate successful detection or no detection. When there is a successful detection, the detected phrase is returned.

Various suitable technologies for recognizing speech are known in the art. The inventors contemplate that the present invention can be used with many different types of voice recognition systems. No particular implementation is recognized as being better than another. While FIG. 2 shows the voice recognition being broken up into three modules (AI, VR1 and VR2), it is contemplated that other designs will also work with the present invention. In one embodiment, modules VR1 and VR2 are separate voice recognition systems that include separate dictionaries and separate code for accessing the dictionaries. In other embodiments, VR1 and VR2 are voice recognition systems that include separate dictionaries; however, both dictionaries are accessed by one set of code. In one embodiment, module AI includes speech recognition software that can access dictionaries in VR1, VR2 or other speech recognition systems. Thus, a speech recognition system includes a dictionary. In some cases, a speech recognition system may also include other software for using the dictionary.

VR1 includes numbers and a small set of commands. VR2 includes a set of street names for a map. In another embodiment, VR1 can be used to only store commands and VR2 can be used to store names and numbers.

There are at least two reasons for breaking up speech recognition into two systems. By having VR1 only include numbers (10 digits) and commands, the dictionary for VR1 is very small and, therefore, the time needed for recognizing words using VR1 is also very small. More importantly, using a small dictionary for commands and numbers significantly increase the reliability that the speech will be recognized correctly. Thus, when a user states simple commands, response from the system can be quicker and more reliable than if the system had to search through a very large dictionary. A user may be more willing to wait for the recognition of a street name than to wait for the map to change in response to a zoom or pan command. Another reason for using more than one speech recognition system is because the present invention can be used with multiple maps. In one embodiment, the speech system of VR1 can be used with many different maps because it does not include data specific to a particular map, such as street names. The speech recognition system VR2 can be used to store map specific words such as street names that appear in the particular map. In other embodiments, the present invention can use more than two speech recognition systems. The universe of recognized speech can be divided among the multiple speech recognition systems.

In one embodiment, speech recognition system VR1 includes digits and map commands. The digits include 0, 1, 2, 3, 4, 5, 6, 7, 8 and 9. The map commands include directive commands, map manipulation commands and map display commands. The directive commands include yes, no, restart, goecoding, pathfinding and cross street. The map manipulation commands include zoom-in, zoom-out, pan-left, pan-right, pan-up and pan-down. The map display commands include clear-path, clear-starting-point, clear-destination-point and print directions.

Figure 3:
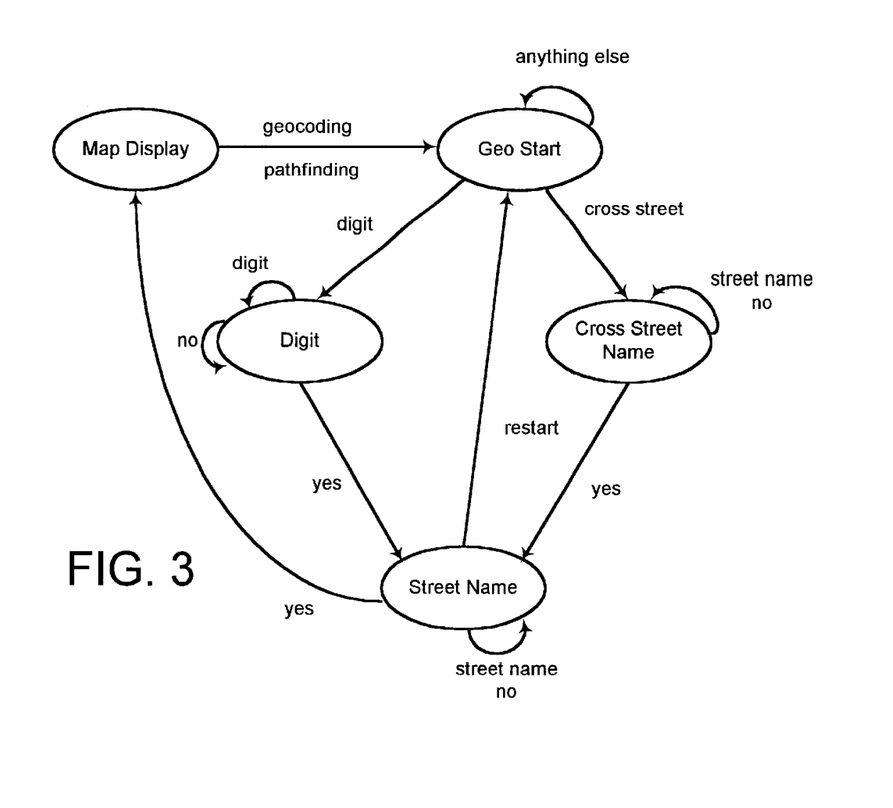
FIG. 3 is a state diagram which describes one embodiment of the Geo module depicted in FIG. 2.

FIG. 3 is a state diagram which explains the operation of one embodiment of the Geo module depicted in FIG. 2. When first started, module Geo starts in the Map Display state. Module Geo will stay in the Map Display state until it receives either a goecoding command or a pathfinding command. By receiving a goecoding command it is meant that an operator will speak into microphone 30 and state "goecoding," and the system will recognize the speech as the phrase "goecoding." The speech is recognized using VR1. After receiving either a geocoding or a pathfinding command, module Geo enters the Geo Start state. If the operator talking into microphone 30 states, and the system recognizes, a digit (e.g. 1, 2, 3, . . . ), then module Geo enters the Digit state. If, while in the Geo Start state, the operator speaking into the microphone 30 states, and the system recognizes, the command "cross street" then module Geo enters the Cross Street Name state. If the operator speaking into microphone 30 states, or the system recognizes, anything other than a digit or the cross street command, then module Geo stays in the Geo Start state.

While in the Digit state, if the operator speaking into microphone 30 states, and the system recognizes, another digit module Geo will remain in the Digit state. While in the Digit state, module Geo will cause the output display 26 to display the digits recognized by the speech recognition system in order to allow the operator to confirm the digits. If the operator speaking into microphone 30 states, and the system recognizes, "no," then module Geo erases the previous digit (similar to backspace on a keyboard). While in the digit state, if the operator speaking into microphone 30 states, and the system recognizes, "yes," then module Geo assumes that the digits displayed on display 26 are correct and represent the full number portion of an address, which is also called a building number. Module Geo proceeds to the Street Name state in order to receive the input of a street name to match the building number. While in the Street Name state, if the operator speaking into microphone 30 states (or pronounces), and the system recognizes, the name of a street, module Geo will stay in street name state and cause output display 26 to display that street name that was recognized using VR2. The user can confirm the accuracy of the recognized street name by stating "no" or "yes," If the user states "no," the street name is erased and module Geo waits for the user to input another street name into microphone 30. If the user states, and the system recognizes, "yes," then the module Geo assumes that the street name recognized is correct and proceeds to the Map Display state. At this point, module Geo has received the input of a number and street name corresponding to an address of the location for geocoding or some other function.

When in the Cross Street Name state, module Geo waits for the operator to state a street name. If the user states a street name, the street name is recognized using VR2 and displayed using output display 26. The operator is given the opportunity to confirm the street name by stating "no" or "yes." If the operator states "no," then the street name displayed on output display 26 is deleted and module Geo waits for another street name. If the operator states, and the system recognizes, a "yes," the system proceeds to the Street Name state.

As described above, the operator has two options for entering the location. The first option is to enter a building number and street name (e.g., 24 Main Street). The second option is to enter an intersection by stating two cross streets (Harrison Street and Ninth Avenue). After the location is identified using either of the two methods, module Geo proceeds to the Map Display state. In the Map Display state, module Geo calls whatever map data manipulation functions have been requested. Two examples of relevant map data functions are geocoding and pathfinding. Geocoding is a process of finding a location on a map, given a description of that location (e.g., telephone number, address, other description, etc.). Pathfinding is the process of finding a path from an origin to a destination. Based on the operator stating, and the system recognizing, a "geocoding" or a "pathfinding" command before entering the Geo Start state, that the module Geo in the Map Display State calls the appropriate functions, receives the output from the appropriate functions and reports the output to the operator.

Figure 4:
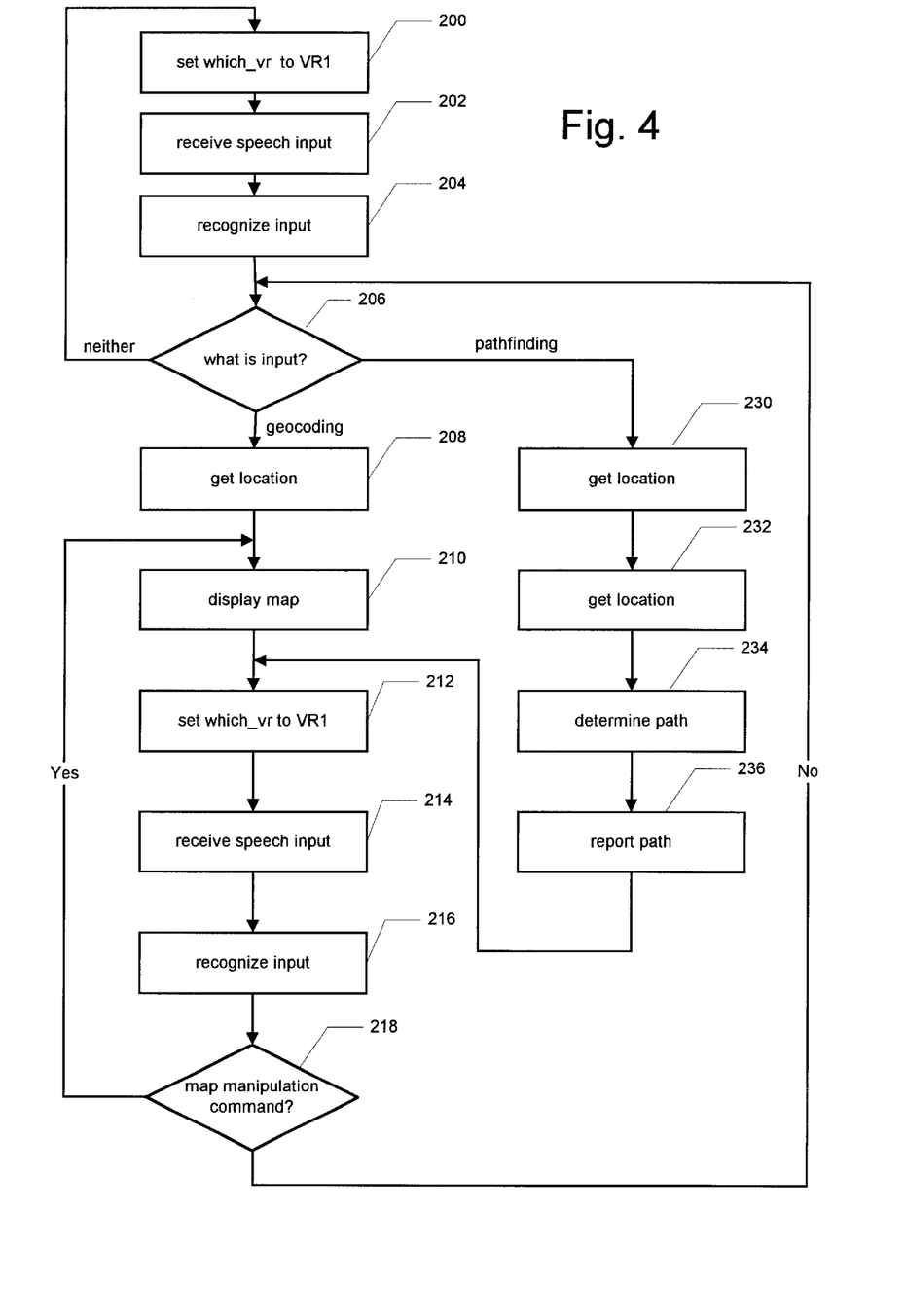
FIG. 4 is a flow chart that describes the operation of one embodiment of the present invention.
Figure 5:
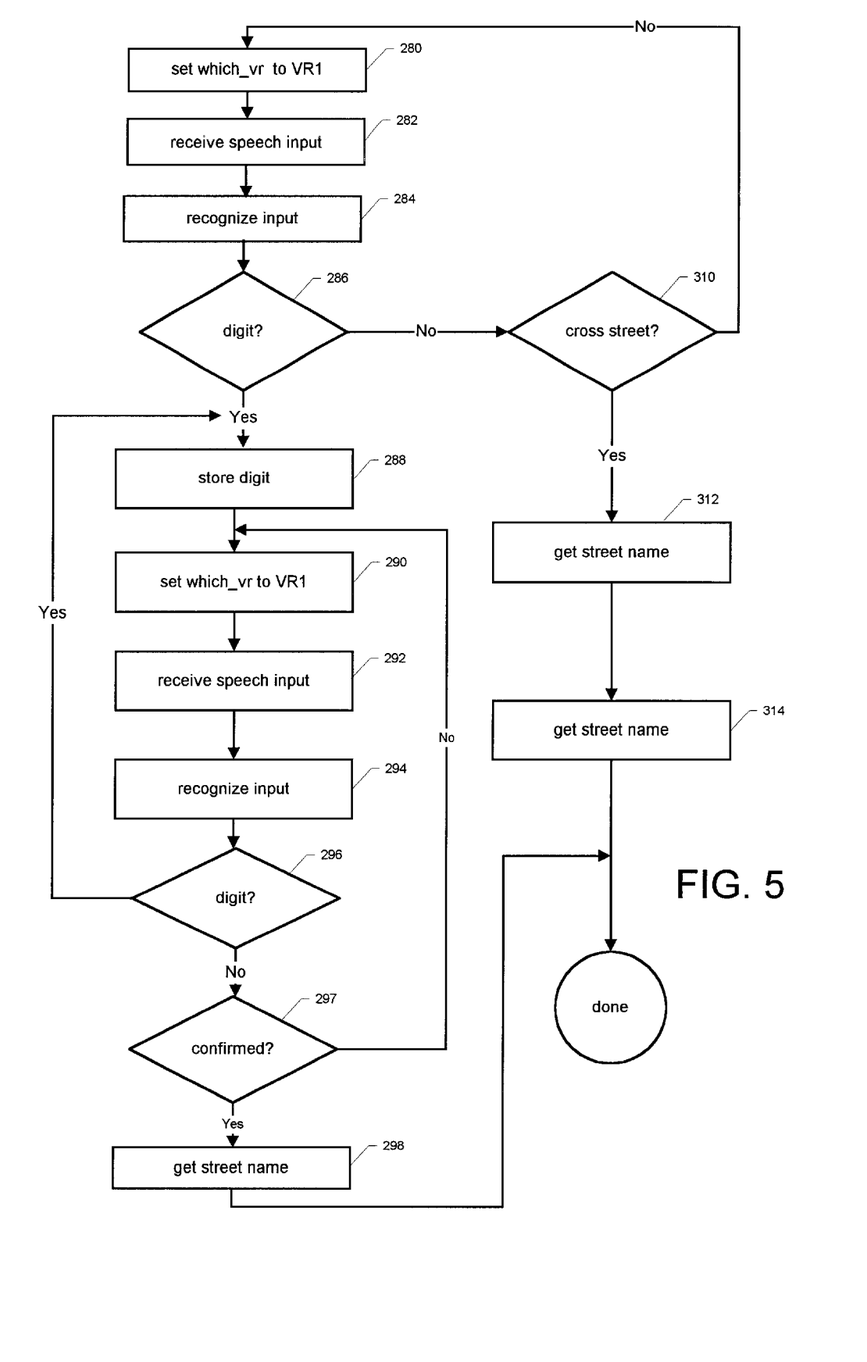
FIG. 5 is a flow chart that describes the method of performing the get location step of FIG. 4.
Figure 6:
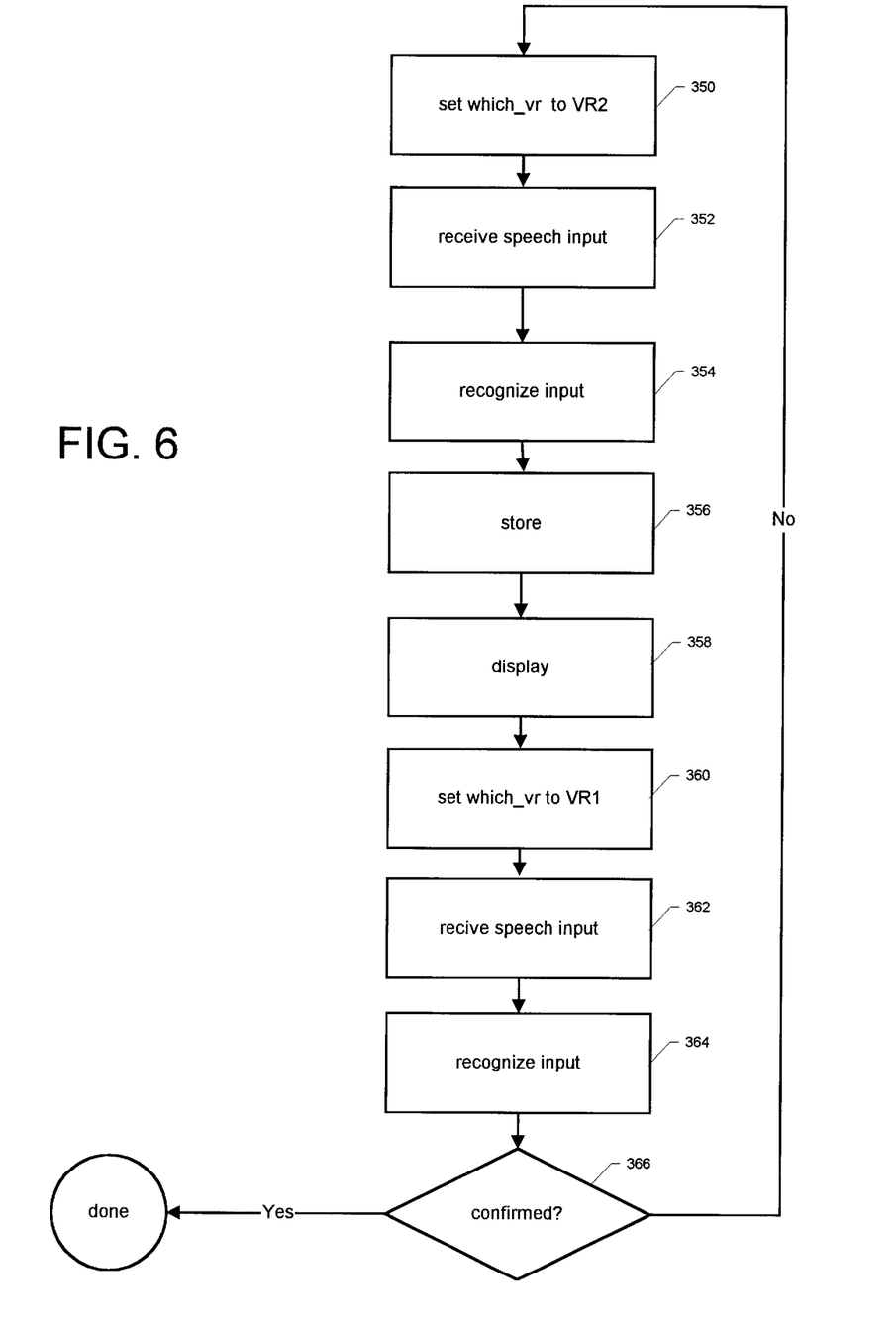
FIG. 6 is a flow chart that describes the method of performing the get street name step of FIG. 5.

FIG. 4 is a flowchart which describes the operation of the system of using speech recognition with map data. The method of FIG. 4 encompasses the functions of modules VR1, VR2, AI and Geo, as well as map data functions. One aspect which is explained in FIGS. 4–6 is a method for selecting which speech recognition system to use (e.g. VR1 or VR2). The system of the present invention includes a state variable which_vr. This variable can be set to be equal to VR1 or VR2. When the state variable which_vr is set to VR1, then the subsequent speech input is recognized using speech recognition system VR1. When the state variable which_vr is set to VR2, then the subsequent speech input is recognized using the speech recognition system VR2.

In step 200 of FIG. 4, the state variable which_vr is set to VR1. The module Geo is in the Map Display state. In step 202, the speech input is received. In one embodiment, the speech input is received via microphone 30 and audio system 28. In another embodiment, speech input can be received from telephone lines. In step 204, the speech input is recognized. Because in step 200 the state variable which_vr was set to VR1, the step of recognizing the speech input is performed using the speech recognition system VR1. Step 206 determines whether the recognized input was the command for pathfinding, the command for geocoding or something else. If the input was a command for geocoding, the system proceeds to step 208 and module Geo enters the Geo Start state. If the input was a command for pathfinding, the system proceeds to step 230 and module Geo enters the Geo Start state. If the received input is neither geocoding or pathfinding, the systems loops back to step 200.

If the command received in step 202 and recognized in step 204 was the command for geocoding, then the system proceeds to get location step 208 in order to receive the location for geocoding. After receiving the location for geocoding, the system displays a map in step 210. The map depicts the location received in step 208. In step 212, the state variable which_vr is set to VR1 (module Geo is in the Map Display state). In step 214, the system receives speech input and in step 216 the received input is recognized using VR1. In step 218, the system determines whether the input received was a map manipulation command. If it was a map manipulation command, the system loops back to step 210 and redisplays the map after performing the map manipulation command.

If in step 218 it is determined that the received and recognized input was not a map manipulation command, the system loops back to step 206 to determine whether the received input was a geocoding command or a pathfinding command.

If in step 206 it is determined that the received input was a pathfinding command, then the system loops to step 230. To find a path, the system needs an origin and a destination. In step 230, the system performs the get location step in order to acquire an origin. In step 232, the system performs the get location step to acquire a destination. In step 234, the system determines a path from the origin to the destination (module Geo is in the Map Display state). In step 236, the system reports the path found. Reporting the path found can include displaying a map showing the path, displaying a map with a path highlighted on the map, providing turn-by-turn directions, providing an audio output giving turn-by-turn directions, creating and passing a file with data describing the path, passing a pointer to data describing the path, passing data describing the path in response to a function call, etc. Reporting the path can also include providing information about a portion of the path computed in step 234. Subsequent to step 236, the system loops back to step 212 to allow the operator to input appropriate commands. In one embodiment, if the operator states the restart command at any time during the entire process when the system is using VR1, the system will restart to step 200. If the operator states a clear-destination-point, the system will reset itself back to step 232, if appropriate. If the operator states a clear-starting-point, the system will go back to step 230, if appropriate. If, during step 236, the operator states a print-directions command, turn-by-turn directions and/or a map showing the route found will be printed.

FIG. 5 is a flowchart which explains the get location step (steps 208, 230 and 232 of FIG. 4). In step 280, the system sets the state variable which_vr to VR1. Module Geo is in the Geo Start state. In step 282, the system receives speech input and in step 284 the system recognizes that speech input using VR1. If the speech input was a digit (step 286), then the system moves to step 288 and module Geo enters the Digit state. Otherwise, the system loops to step 310. In step 288, the system stores the value of the digit received in the speech input. In step 290, the system sets the state variable which_vr to VR1. Instep 292, the system receives speech input using VR1. Instep 294, the system recognizes the speech input. If the input received was a digit (step 286), then the system loops back to step 288; otherwise, the system proceeds to step 297 to determine whether the operator confirmed the street number. That is, as the digits are recognized, they are displayed and stored. While the digits are displayed, if the operator states a "yes," the digits displayed are confirmed to be a building number and the system proceeds to step 298 which includes the step of getting the street name associated with the number received by the previous steps. In step 298, Module Geo is in the Street Name state. After step 298, the process of FIG. 5 is done. If in step 297 it is determined that the building number is not confirmed, the last digit is erased and the system loops to step 290.

If in step 296 it is determined that the received and recognized input was not a digit, the system checks (in step 310) whether the received and recognized input is the command "cross street." If it is, the system proceeds to step 312 to perform the step of getting a street name and module Geo enters the Cross Street Name state. Step 314 also includes the step of getting a street name (module Geo is in the Street Name state). Thus, steps 312 and 314 are the process of getting two street names that represent an intersection defined by two cross streets. After step 314, the method of FIG. 5 is completed. Note that in step 310, if the received and recognized input was not a cross street command, then the system moves back to step 280.

In one embodiment, step 314 is performed using a different speech system than either VR1 or VR2. Step 314 is an attempt to get a street name that crosses the street acquired in step 312. Thus, a speech recognition system that only searches through street names that cross the street acquired in step 312 can more quickly and more reliably recognize the speech input received in step 314. This improvement can be accomplished using separate cross street dictionaries for each street in VR2.

FIG. 6 is a flowchart which describes the method of getting a street name (steps 298, 312 and 314 of FIG. 5). In step 350, the system sets the state variable which_vr to VR2. In step 352, the system receives speech input. In step 354, the system recognizes the speech input using VR2. In step 356, the system stores the recognized speech, which should be text of a street name. In step 358, the street name is displayed on output display 26. In step 360, the system sets the state variable which_vr to VR1. In step 362, the system receives speech input. In step 364 the system recognizes the speech input using VR1. In step 366, the system determines whether the street name displayed in step 358 has been confirmed. That is, if the operator stated and the system recognized a "no," then the street name was not confirmed and the system loops back to step 350. If the operator stated and the system recognized a "yes," then the street name was confirmed and the method of FIG. 6 is completed. In one embodiment, receiving anything but a "yes" is considered to be a lack of confirmation.

Step 234 of FIG. 4 includes determining a path from an origin to a destination. In order to explain how to determine a path, a brief background regarding electronic maps is provided. An electronic map of roads is stored in one or more computer files which include the data necessary to construct a map. This data could include longitude and latitude data, addresses, distances, road information, turning restrictions, driving times, highway exit numbers, descriptions of commercial uses of properties, etc. Although the above listed information can be found in an electronic map, it is possible to create an electronic map with only a subset of the above listed information or with other information. The computer file(s) representing an electronic map are stored on a processor readable storage medium.

Generally, an electronic map to be used for pathfinding includes a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph in which each edge has a single direction associated with it. There may be two edges between a given pair of nodes, one in each direction. In a directed graph, edges are referred to as links. A weighted graph is a graph in which each link (or edge) has a cost associated with it. Alternatives include associating the costs with the nodes, with the nodes and links, or with another element of the graph. An undirected graph is a graph where each link is bidirectional. An undirected graph can be thought of as a directed graph where each link represents two links with the same end points but different directions.

Figure 7A:
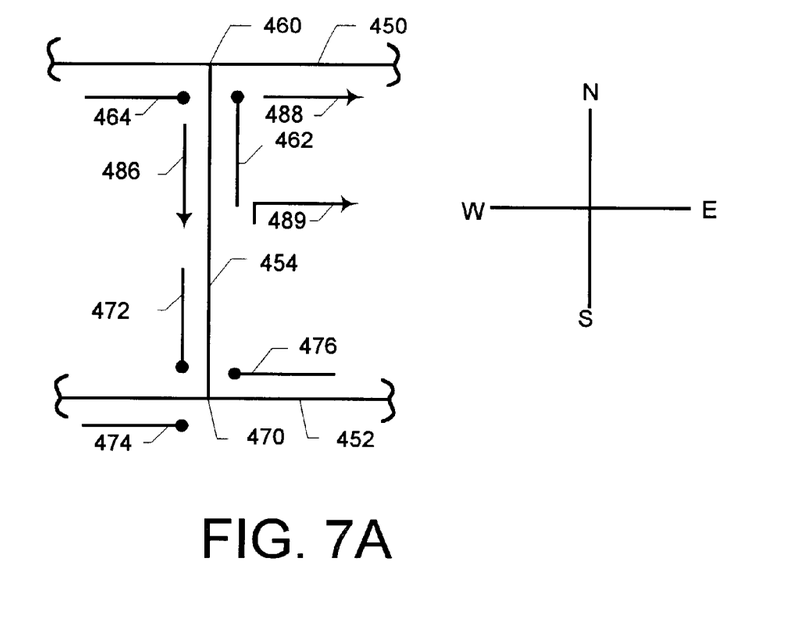
FIG. 7A is an example of a directed graph representing a part of an electronic map.

FIG. 7A shows an exemplar directed graph which shows eastbound one-way street 450 and two-way street 452, both intersecting with two-way street 454. Street 450 intersects with street 454 at intersection 460. Street 452 intersects with street 454 at intersection 470. At intersection 460 are two nodes, 462 and 464. The head of the node is a solid circle. The rear of the node is a straight-line tail. The circle represents where the node is located and the tail represents where a traveler would come from to reach that node. The node symbol is displaced from the actual intersection for purposes of visibility. For example, node 462 represents travel northbound on street 454 toward intersection 460. Node 464 represents travel eastbound on road 450 toward intersection 460. There is no node at intersection 460 to represent westbound travel on street 450 because street 450 is an eastbound one-way street. Thus, a traveler proceeding north on road 454 and reaching intersection 460 can only make a right turn. Node 472 represents arriving at intersection 470 by traveling south on street 454. Node 474 represents arriving at intersection 470 by traveling east on road 452. Node 476 represents arriving at intersection 470 by traveling west on road 452.

Links represent a path between nodes. For example, from node 464 a traveler can make a right turn at intersection 460 to enter road 454 or can proceed straight on road 450. Link 486 represents travel starting from intersection 460 on road 450 facing east, making a right turn at intersection 460 and proceeding south on road 454. Thus, link 486 connects node 464 to node 472. Link 488 connects node 464 to the next node on street 450 (not shown on FIG. 7A) and represents travel east along road 450, proceeding straight through intersection 460 without turning. Link 489 represents travel starting from intersection 460 on road 454 facing north, making a right turn at intersection 460 and proceeding east on road 450; therefore, link 489 connects node 462 to the next node on street 450 (not shown on FIG. 7A). FIG. 7A only shows links drawn for nodes 462 and 464. If links are drawn for all nodes, the directed graph would become too crowded and would be difficult to read. Thus, the directed graph is simplified and redrawn as in FIG. 7B.

Figure 7B:
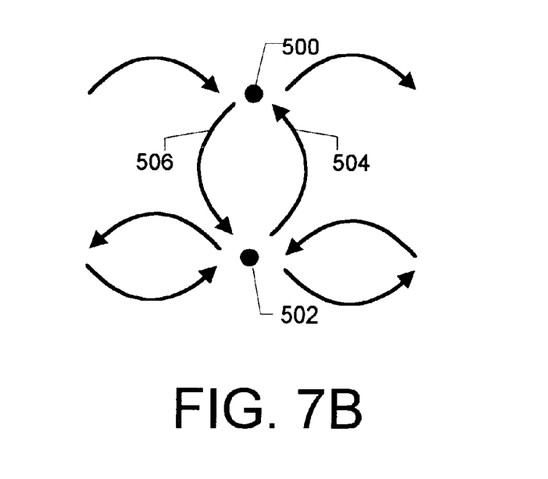
FIG. 7B is a second example of a directed graph representing a part of an electronic map.

In FIG. 7B, all the nodes at the same intersection are collapsed into one node. (In actual use, the present invention can make use of a graph similar to FIG. 7A or FIG. 7B.) Thus, node 500 represents nodes 464 and 462. Node 502 represents nodes 472, 474 and 476. Note that the tails of the nodes are not drawn. The links are used to indicate directions of allowable travel. Link 504 indicates travel from intersection 470 to intersection 460 and link 506 indicates travel from intersection 460 to intersection 470.

Figure 8:
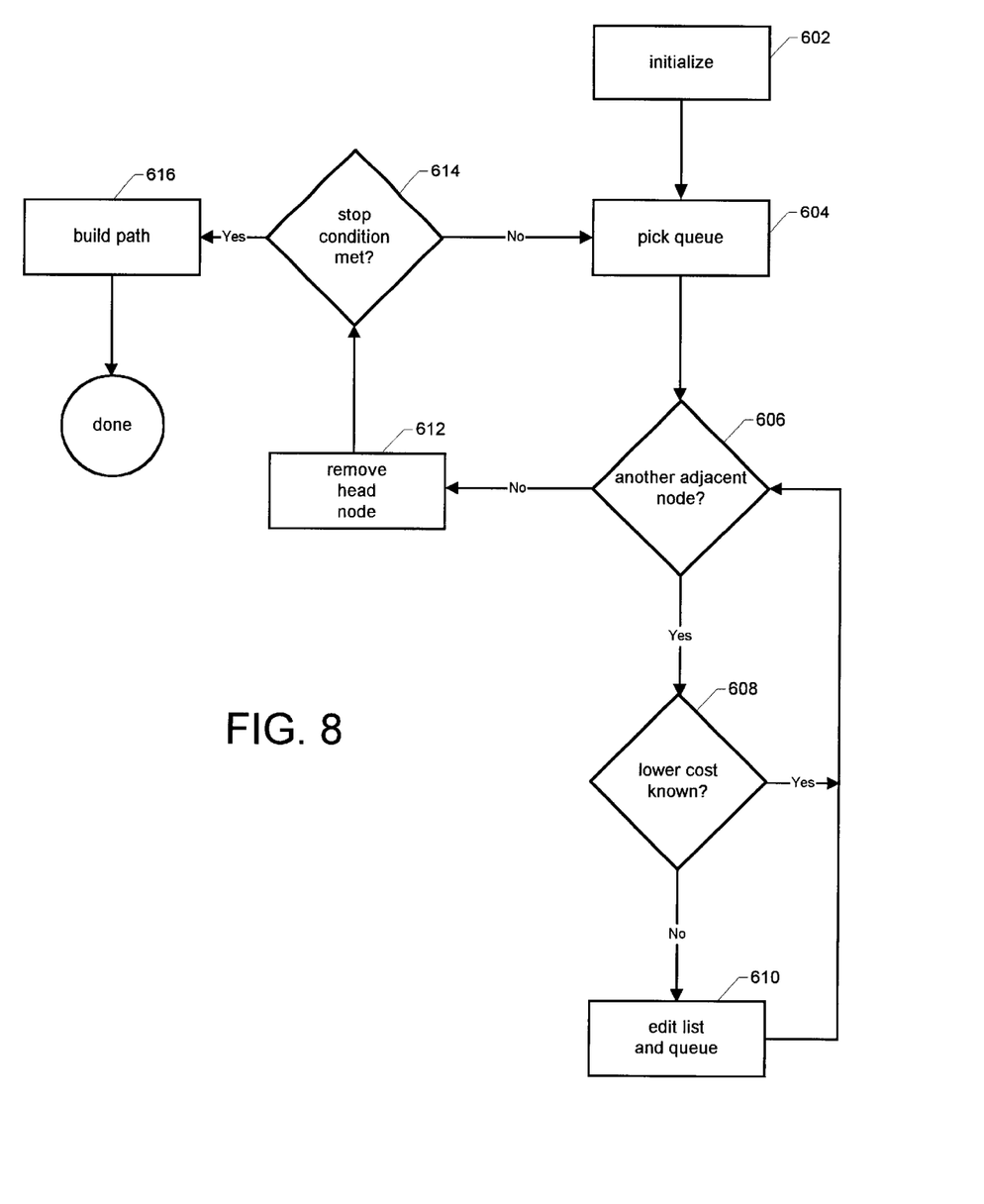
FIG. 8 is a flow chart describing a method for determining a path between an origin and a destination.

FIG. 8 is a flow chart which explains the method of determining a path from an origin to a destination (step 234 of FIG. 4). The method of FIG. 4 is only one of many methods of pathfinding known in the art. Other methods of pathfinding can also be used with the present invention. In step 602, the system initializes the pathfinding exploration. That is, the system stores the origin and destination of the path and sets up two queues: an origin priority queue and a destination priority queue. The origin priority queue consists of an ordered list of nodes, to each of which a path from the origin is known, and a key for each node. The queue is sorted according to the key. There are various alternatives for determining the key. In one alternative, the key is the lowest known cost of traveling from the origin to the node. An alternative key includes the sum of the known lowest cost from the origin to the node plus an estimated cost of traveling from the node to the destination. There are various alternatives for estimating the cost for traveling from the node to the destination which are suitable for this method. One example includes multiplying the direct "as-the-crow-flies" distance by the estimated cost per unit distance. That is, disregarding the nodes and links, determining the physical distance between the node and the destination and multiplying that distance by an estimated cost per unit distance.

The destination priority queue consists of an ordered list of nodes, from each of which a path to the destination is known, and a key for each node. The queue is sorted according to the key. There are many alternatives for determining a destination key. One alternative includes using the known lowest cost path from the node to the destination. An alternative key includes using the sum of the known lowest cost from the node to the destination plus an estimated cost from the origin to the node. The key described above for the origin priority queue which utilizes the estimated remaining costs produces an exploration from the origin that is biased in the direction of the destination. Similarly, an exploration from the destination is biased in the direction of the origin. Other methods of computing a key are within the scope of the present invention.

Additionally, the system sets up an origin visited list and a destination visited list. The origin visited list maintains a list of all nodes to which paths from the origin are known, the lowest cost for traveling from the origin to the node, and the previous node along the path with that lowest cost. The destination visited list stores the name of each node for which paths to the destination are known, the known lowest cost for traveling from the node to the destination, and the identity of the next node along the path to the destination with that lowest cost. After the initialization step 602 is completed, the origin priority queue and the origin visited list include the origin, and the destination priority queue and the destination visited list include the destination.

Once the system is initialized, the system chooses a queue according to a rule in step 604. There are many rules of picking a queue which are suitable for the present invention. In one system, the queue containing the element with the smallest key is chosen, with ties broken arbitrarily. In another system, the queue containing the least amount of elements is chosen. Other examples of rules for choosing a queue include alternating between queues; or choosing the origin queue for a certain number of iterations (or a time period), switching to the destination queue for a certain number of iterations, switching back to the origin queue for a certain number of iterations, etc. Since the queues are sorted by keys, the node with the smallest key will be at the head of the queue (also called the front or the top of the queue). This node is called the "head node."

In step 606, the system looks for all nodes which are adjacent nodes to the head node of the chosen queue and picks one of those nodes. Since the system has just started, the only node in the origin priority queue is the origin. The adjacent nodes are those nodes which can be traveled to/from (whichever is appropriate) the head node without going through any other nodes. In step 608, the system determines whether there is a lower cost known on the visited list or the priority queue for the adjacent node picked. That is, the system determines the cost of traveling between the adjacent node and the head node and adds that cost to the cost already known for the head node. If there is no lower cost known then, in step 610 the system edits the visited list and the priority queue to add the adjacent node and its cost. The method loops back to step 606 to determine whether any additional adjacent nodes have not been considered. If all of the adjacent nodes have been considered, then the method proceeds to step 612 and the head node is removed from the priority queue.

In step 614, the system determines whether a stopping condition has occurred. There are many stopping conditions which are suitable for the present invention, for example, stopping when a node has been the head node on both the origin priority queue and the destination priority queue. Another stopping condition includes stopping when the cost of traveling from the origin to the head node in the origin priority queue plus the cost of traveling from the head node of the destination priority queue to the destination is greater than or equal to the total cost of the best connection node. A connection node is the node that appears on the destination visited list and the origin visited list. Total cost of a connection node is the cost from the origin to the connection node plus the cost from the connection node to the destination. The best connection node is the connection node with the lowest total cost. If the stopping condition has not been met, the system proceeds to step 604 and picks the other queue. If the stopping condition is met, the system builds the path in step 616.

The step of building the path is as follows. A rule selects some connection node. One such rule is to choose the best connection node. The selected connection node K is looked up in the origin visited list and the previous node $P_1$ on the path from the origin is found. If $P_1$ is not the origin, then $P_1$ is looked up in the visited list and the previous node $P_2$ is found. This continues until the origin is reached. Suppose the origin is reached as node $P_L$. Similarly, K is looked up in the destination visited list and the next node $N_1$ is found. If $N_1$ is not the destination, then $N_1$ is looked up in the visited list This continues until the destination is reached. Suppose the destination is reached as node $N_M$. At this point the path from the origin to the destination is known: it is the path from $P_L$ (the origin) to $P_{L-1}$, to $P_{L-2}$, . . . , to $P_2$, to $P_1$, to K, to $N_1$, . . . , to $N_{M-1}$, to $N_M$ (the destination). Additional information about pathfinding can be found in Caching For Pathfinding Computation, by Richard Frederick Poppen, Rodney Jude Fernandez and James Laurence Buxton, Ser. No. 08/802,733, filed on Feb. 20, 1997; and A System For Pathfinding, by Koji Amakawa and Edward Joseph Suranyi, Ser. No. 09/023,504, filed on Feb. 13, 1998, both incorporated herein by reference.

One alternative embodiment of the present invention includes allowing a user to input a description of a location in order to find that location. For example, a user can state an address and then ask for the nearest hotel to that address. To accomplish this, the command in VR1 would include a command "hotel." Other commands can also be includes such as "restaurant," "park," etc. These commands would be stated by the user while the system is in the Map Display state (see FIG. 3). Thus, the user can issue any of the possible commands (geocoding, pathfinding, hotel, restaurant, park, etc.). When the system loops back in to the Map Display state, rather than pathfinding, the system will display the nearest hotel, restaurant, park, etc.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of using speech recognition with electronic map data, the method comprising the steps of:

receiving a first speech input;

recognizing said first speech input using a first dictionary, said first dictionary includes commands and numbers;

determining whether said first input includes a command to geocode or pathfind;

receiving a second speech input;

recognizing said second speech input using said first dictionary;

determining whether said second input includes a cross street command or a number;

receiving a third speech input;

recognizing said third speech input using said first dictionary if said second input was said number;

recognizing said third speech input using a second dictionary if said second input was said cross street command;

receiving a fourth speech input;

recognizing said fourth speech input using said first dictionary;

determining whether said fourth input includes a confirmation;

finding a first location in a processor readable representation of a map using said recognized third speech input;

reporting said first location if said first input includes said command to geocode; and, determining and reporting a path having said first location being an endpoint of said path if said first input includes said command to pathfind.

* * * * *